Figure 1:
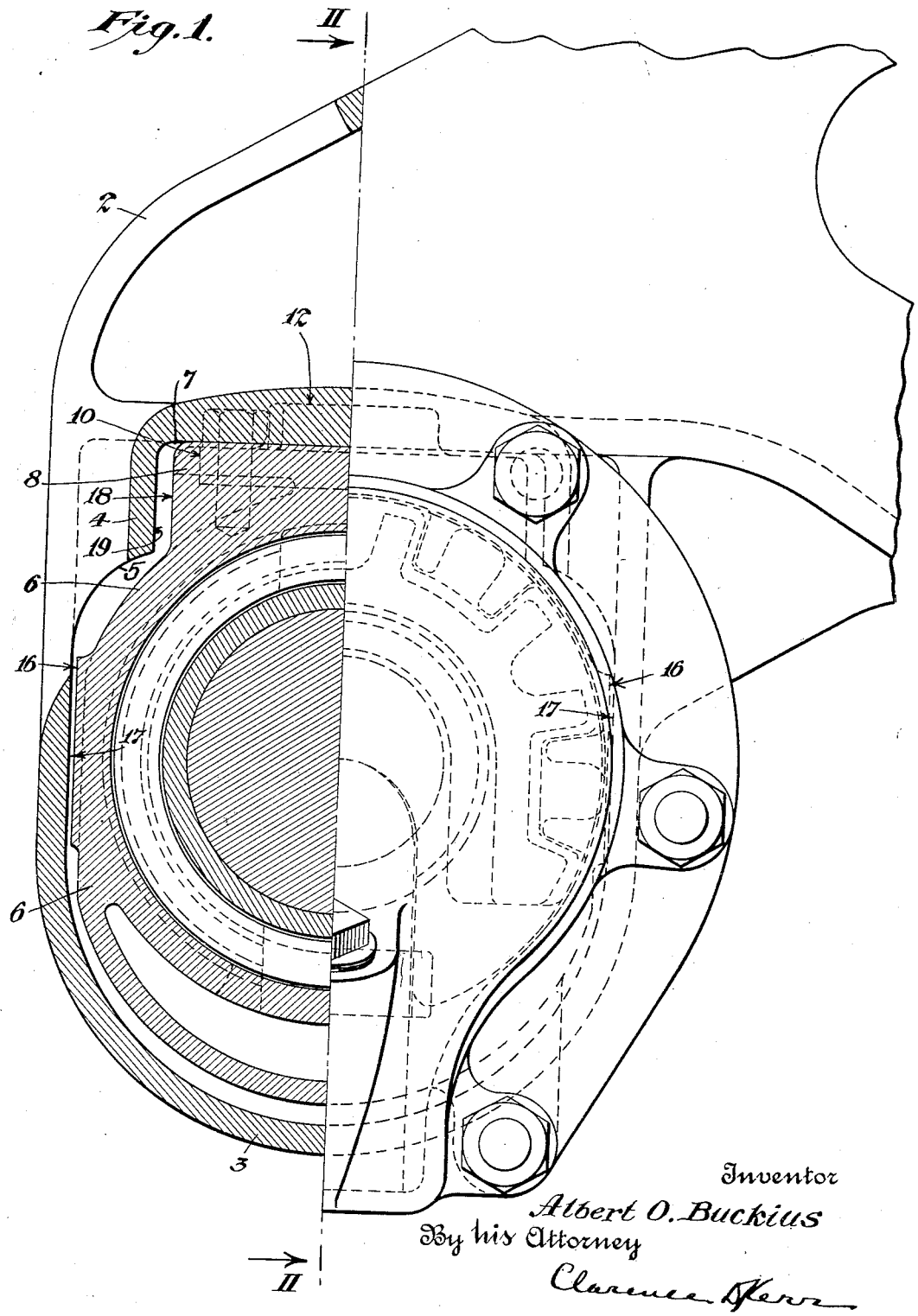

Oct. 20, 1931.    A. O. BUCKIUS    1,828,313
JOURNAL BOX
Original Filed April 27, 1928    5 Sheets-Sheet 1

Inventor
Albert O. Buckius
By his Attorney
Clarence Kerr

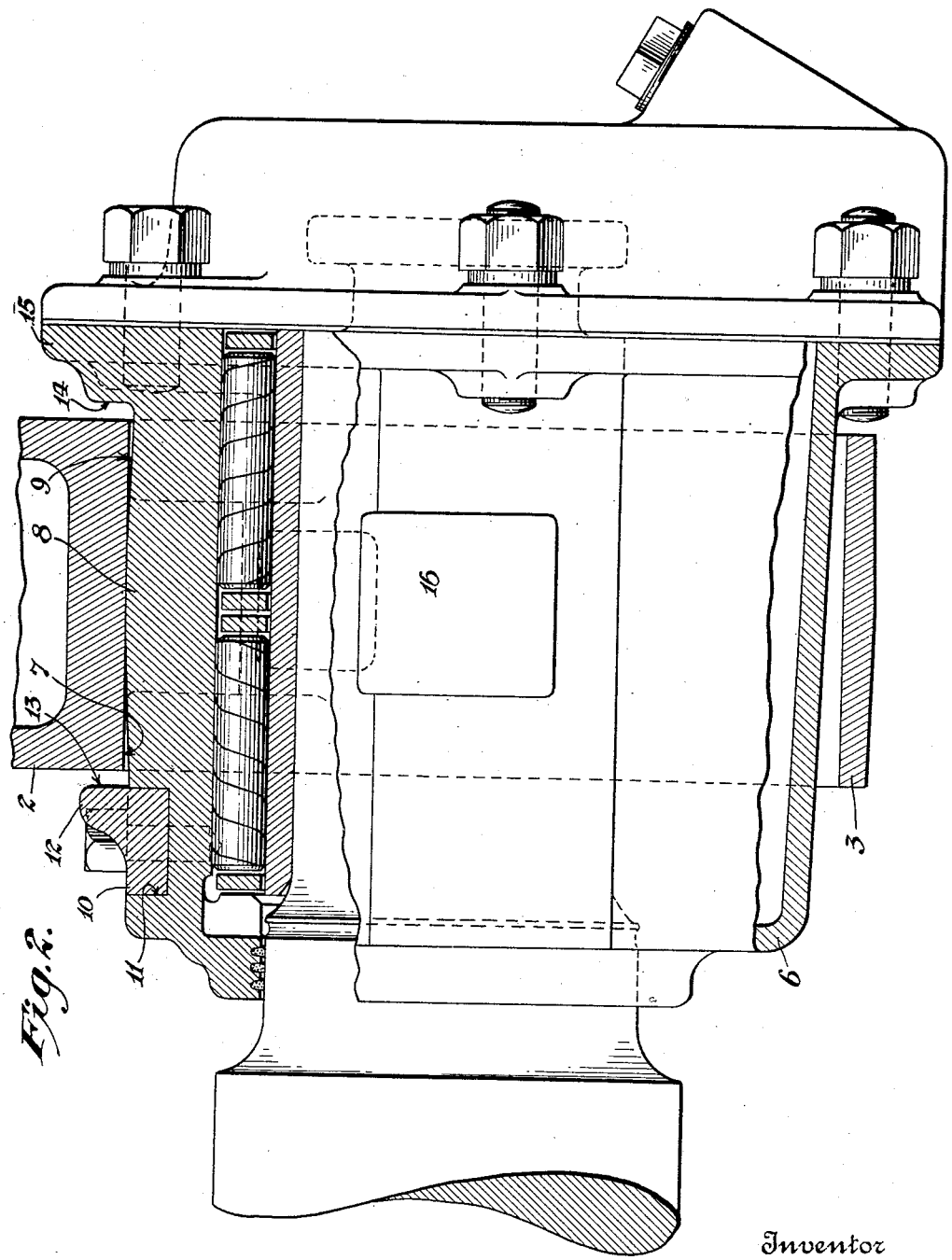

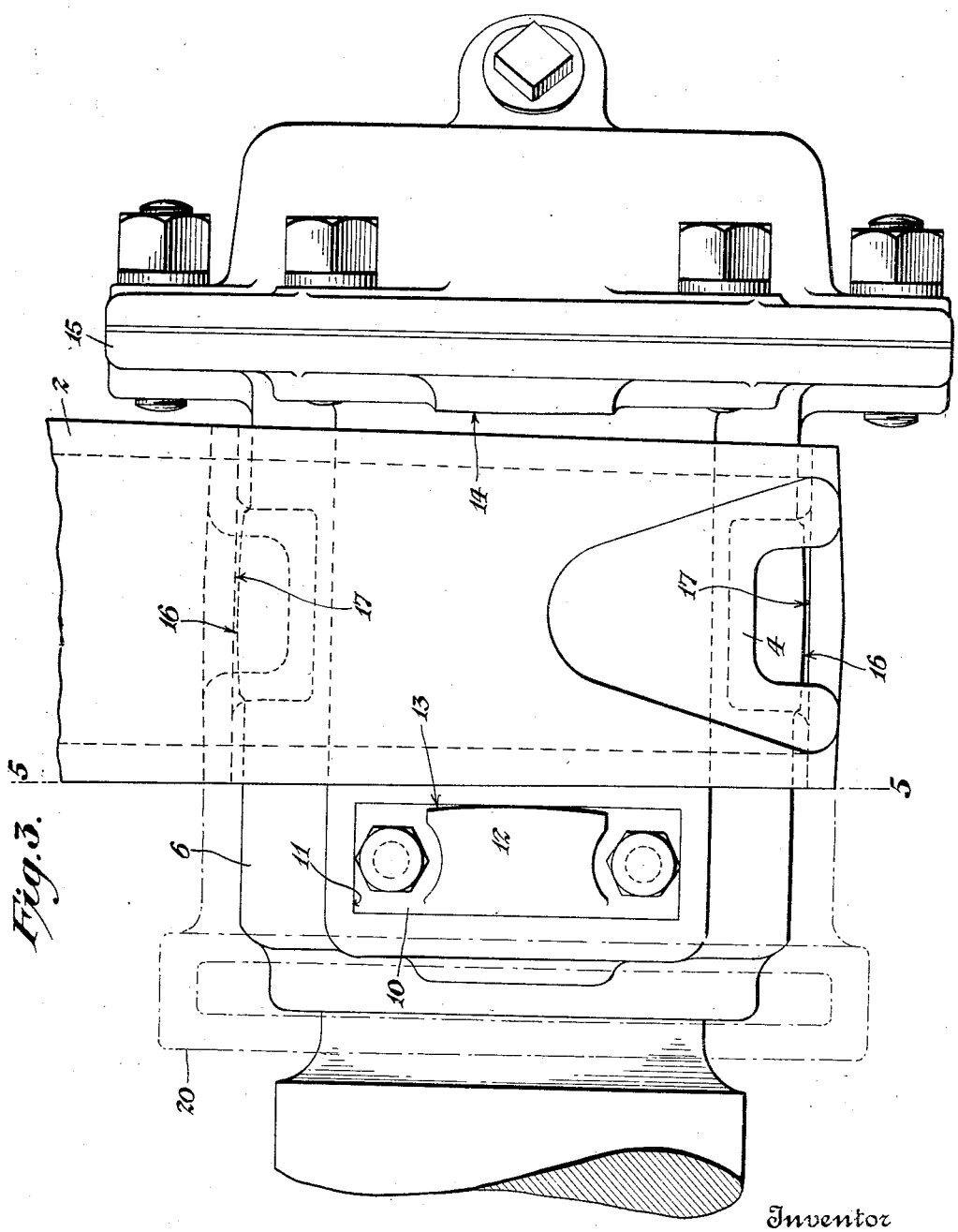

Oct. 20, 1931.   A. O. BUCKIUS   1,828,313
JOURNAL BOX
Original Filed April 27, 1928   5 Sheets-Sheet 4
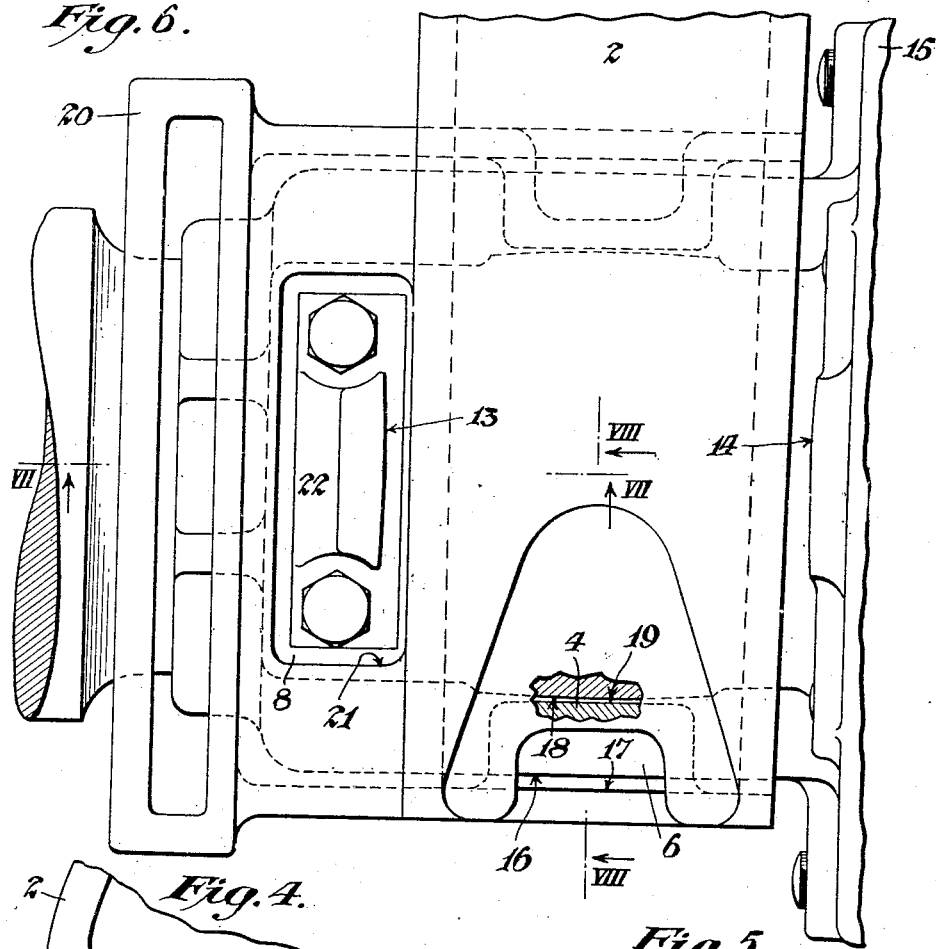
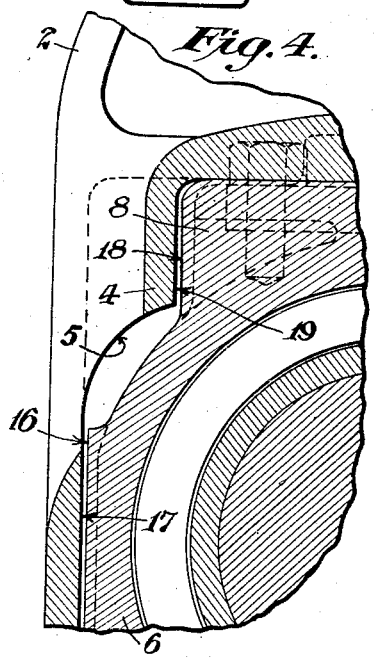
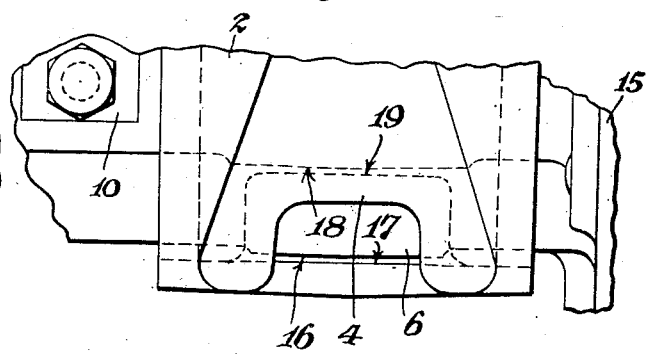
Inventor
Albert O. Buckius
By his Attorney
Clarence D. Kerr Oct. 20, 1931.  A. O. BUCKIUS  1,828,313
JOURNAL BOX
Original Filed April 27, 1928   5 Sheets-Sheet 5
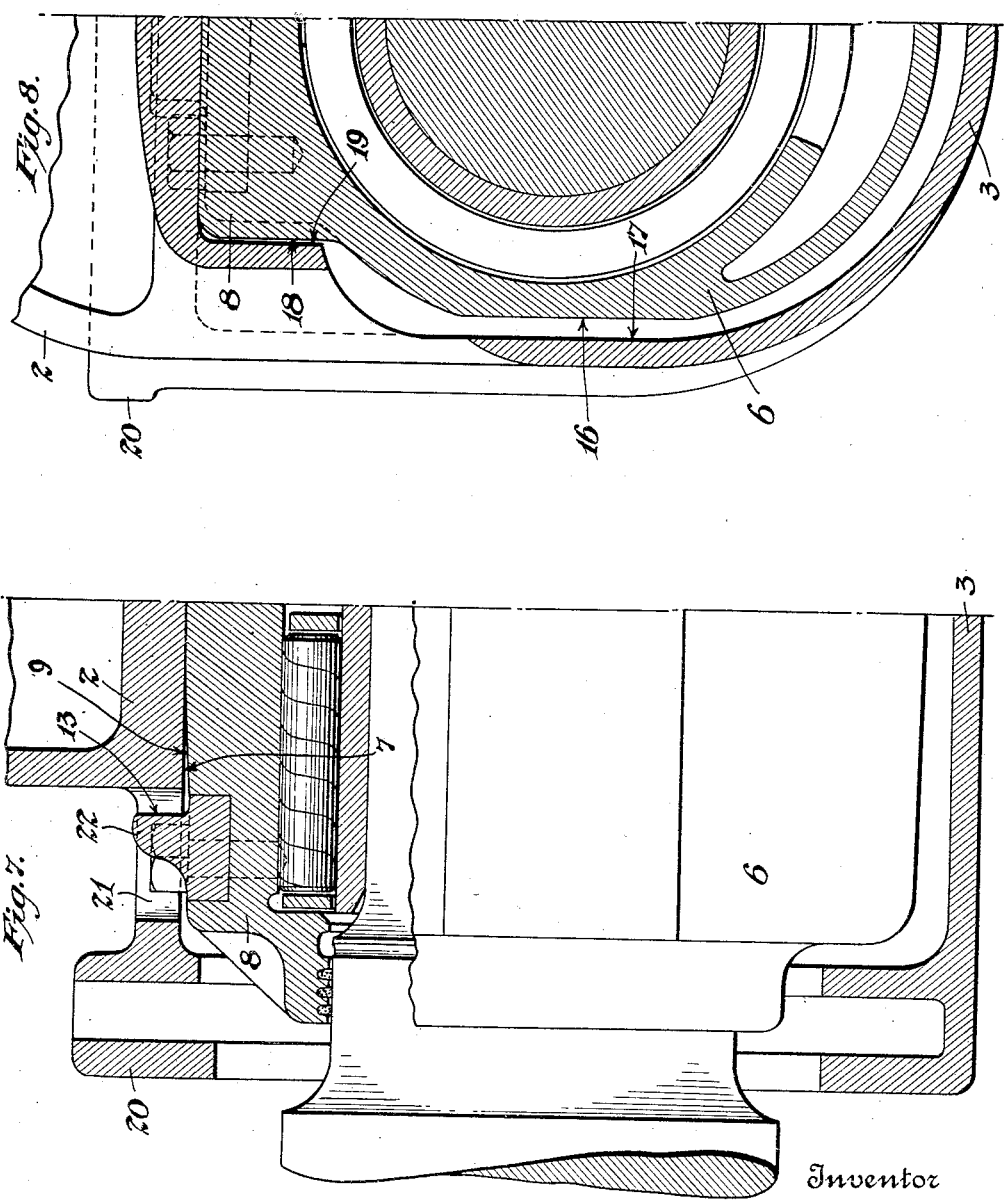
Inventor
Albert O. Buckius
By his Attorney Patented Oct. 20, 1931

1,828,313

UNITED STATES PATENT OFFICE

ALBERT O. BUCKIUS, OF CLEVELAND, OHIO, ASSIGNOR TO NATIONAL MALLEABLE AND STEEL CASTINGS COMPANY, OF CLEVELAND, OHIO, A CORPORATION OF OHIO

JOURNAL BOX

Application filed April 27, 1928, Serial No. 273,235. Renewed April 15, 1931.

My invention relates to journal boxes, and particularly to enabling roller bearing journal boxes to be applied to side frames which have journal boxes made integral therewith and thus permits existing types of side frames to be used with roller bearing journal boxes. My invention also comprises various features which I shall hereinafter describe and claim.

In the accompanying drawings, Fig. 1 is a side elevation, partly in section, of the end of a side frame showing the application of a roller bearing journal box thereto; Fig. 2 is a section on lines II—II of Fig. 1; Fig. 3 is a plan thereof; Fig. 4 is a partial section similar to Fig. 1 but of a modification thereof and Fig. 5 is a partial plan thereof; Fig. 6 is a plan showing a modified form of my invention, with the inner end of the integral box left on; Fig. 7 is a section on lines VII—VII of Fig. 6; and Fig. 8 is a section on lines VIII—VIII of Fig. 6.

Referring more specifically to the drawings, I have shown a side frame 2 of the standard A. R. A. type which is made with the journal box 3 cast integral therewith, but in the present instance the box is cut off flush with the sides of the frame and also has the central wedge block abutments 4 cut back along the lines 5 so that there remains of the journal box little more than a central retaining band which serves to restrict the vertical movement of the roller bearing journal box 6 with respect to the side frame 2 and takes practically all of the pulling and braking thrust therebetween. It will be seen that the roller bearing box 6 fits against the inside surface 7 of the remaining portion of the journal box 3. The top lug 8 of the roller bearing box 6 has a transversely crowned top surface 9 which receives the vertical side frame load through the surface 7 of the inside top wall of the A. R. A. box.

The roller bearing box 6 is inserted from the front of the side frame 2 and is held in position by a retainer block 10, which is bolted into a recess 11 in the top lug 8. The retainer 10 has an outward projection 12 with a radial bearing surface 13, which takes up side thrust against the frame 2. A corresponding radial bearing surface 14 is formed on the flange 15 surrounding the mouth of the roller box 6 to take the end thrust in the opposite direction. The thrust between the box and side frame occasioned by the application of the brakes and by the lag of the wheels and axles as they are dragged along by the side frame is taken through the surfaces 16 on the box and 17 on the side frame, respectively, rather than through the surfaces 18 on the lug 8 and the corresponding surfaces 19 on the frame. The surfaces 16 on the box are preferably crowned slightly, as appears in Fig. 3.

The modification shown in Figs. 4 and 5 may also be employed in which the width of the top lug 8 may be increased so that the clearance between the surfaces 18 of the lug and 19 of the frame would be equal to that between the surfaces 16 and 17. With such a modification the surfaces 16 and 18 are preferably arc-shaped, as are the surfaces 16 shown in Fig. 3. Such an arrangement has the advantage of dividing the pulling and braking thrusts between all of the various surfaces and relieves the thinner portions of the side frame opposite the surfaces 16 and 17 from undue stress.

In the modification of Figs. 6, 7 and 8 the lug on the top of the roller bearing box has been enlarged to a greater extent than is shown in Figs. 5 and 6, and the distance between the surfaces 18 and 19 has been decreased, while the distance between the surfaces 16 and 17 has been relatively increased, so as to take up the thrust between box and frame through the surfaces 18 and 19. The surfaces 18 are accordingly made arc-shaped. Also, in this form of my invention the rear portion 20 of the integral box is left intact, as it appreciably increases the strength of the retaining band which encircles the roller bearing box.

If desired, the rear or inside portion 20 of the integral portion of the box indicated in dotted lines in Fig. 3 may be left intact, as is shown in Fig. 6, thus making it necessary to remove only the portion of the integral box in front of the side frame. To permit the roller bearing box to be secured in such a construction an opening 21 may be cut by an acetylene torch in the rear portion 20 of the integral box frame. Through this opening 21 may be inserted a retainer block 22 similar to the block 10 shown in Figs 2 and 3.

It will therefore be seen that my invention makes it possible to apply to the standard type of side frame and integral box construction a roller bearing type of journal box without interfering with the ease of removability of the cover and thrust member of such a box as is shown in my co-pending application, Serial No. 248,343, filed January 21, 1928.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:

1. The method of adapting a plain bearing, integral box side frame for use with roller bearings comprising removing the end portion of said integral box and inserting, within the remaining portion of said box, a housing containing roller bearings.

2. The method of adapting a plain bearing, integral box side frame for use with roller bearings comprising removing the end portion of said integral box and inserting, within the remaining portion of said box, a housing containing roller bearings, and securing to one of said parts means for retaining said housing in position.

3. The method of adapting a plain bearing, integral box side frame for use with roller bearings comprising removing the end portion of said integral box and inserting, within the remaining portion of said box, a housing containing roller bearings, and limiting relative movement between said housing and box portions in all directions.

4. The method of adapting for use with roller bearings a plain bearing integral box side frame including central wedge block abutments, said method comprising removing an end portion of said integral box, cutting away parts of said abutments, and inserting into the remaining portion of said box a housing containing roller bearings.

5. In combination, a side frame including a portion of a plain bearing journal-box integral with said side frame, a roller bearing journal-box having a bearing within said portion, and means on said roller bearing journal box for maintaining it in operative relation with said portion.

6. In combination, a side frame including a portion of a plain bearing journal-box integral with said side frame, a roller bearing journal-box having a bearing within said portion, means on said roller bearing journal box for maintaining it in operative relation with said portion and means for transmitting the thrust from the roller bearing journal box to said portion and thence to the side frame.

7. In combination, a side frame including a portion of a plain bearing journal-box integral with said side frame, a roller bearing journal box having on its top an arc shaped exterior surface bearing against the interior surface of said portion to permit a limited rocking movement between said box and said portion, and means on said box for maintaining it in operative relation with said portion.

8. In combination, a side frame including a portion of a plain bearing journal-box integral with said side frame, a roller bearing journal box having a plurality of arc shaped exterior surfaces bearing against the interior surfaces of said portion to permit a limited rocking movement between said box and said portion, and means on said box for maintaining it in operative relation with said portion.

9. In combination, a side frame including a portion of a plain bearing journal-box integral with said side frame, a roller bearing journal box having a bearing within said portion, and stops on the box engaging shoulders on said portion adapted to maintain said box and said portion in operative relation.

10. In combination, a side frame including a portion of a plain bearing journal-box integral with said side frame, a roller bearing journal box having a bearing within said portion, and a stop removably secured to said box after seating in the bearing in said portion to maintain said box and said portion in operative relation.

11. In combination, a side frame including a portion of a plain bearing journal-box integral with said side frame, and a roller bearing journal-box having a bearing within said portion.

In testimony whereof, I have signed my name to this specification this 20th day of April, 1928.

ALBERT O. BUCKIUS.